(12) United States Patent
Villalobos

(10) Patent No.: US 7,134,283 B2
(45) Date of Patent: Nov. 14, 2006

(54) SEALED SHAFT GRAVITY BUOYANCY ENERGY SYSTEM AND METHOD OF USE THEREOF

(76) Inventor: Victor Villalobos, 2955 Summitop Ct., Marietta, GA (US) 30066

( * ) Notice: Subject to any disclaimer, the term of this patent is extended or adjusted under 35 U.S.C. 154(b) by 140 days.

(21) Appl. No.: 10/925,680

(22) Filed: Aug. 25, 2004

(65) Prior Publication Data

US 2006/0042244 A1 Mar. 2, 2006

(51) Int. Cl.
F03G 7/00 (2006.01)
(52) U.S. Cl. .......................... 60/639; 60/495
(58) Field of Classification Search .................. 60/639, 60/640, 495, 496
See application file for complete search history.

(56) References Cited

U.S. PATENT DOCUMENTS

| | | | |
|---|---|---|---|
| 1,708,807 A | 4/1929 | Tatay | |
| 2,037,973 A | 4/1936 | Grondahl | |
| 2,135,110 A | 11/1938 | Platt | |
| 2,513,136 A | 6/1950 | Borsos | |
| 3,194,008 A | 7/1965 | Baumgartner | |
| 3,412,482 A | 11/1968 | Kusmer | |
| 3,857,242 A | 12/1974 | Gilmore | |
| 3,934,964 A | 1/1976 | Diamond | |
| 3,984,698 A | 10/1976 | Brewer | |
| 4,054,031 A | 10/1977 | Johnson | |
| 4,084,375 A | 4/1978 | Horvath | |
| 4,201,480 A * | 5/1980 | Brand | 366/79 |
| 4,242,868 A | 1/1981 | Smith | |
| 4,246,756 A * | 1/1981 | West | 60/640 |
| 4,254,622 A | 3/1981 | Denson, Sr. | |
| 4,317,046 A | 2/1982 | Holmberg | |
| 4,363,212 A | 12/1982 | Everett | |
| 4,425,510 A * | 1/1984 | Jury | 290/42 |
| 4,466,244 A * | 8/1984 | Wu | 60/398 |
| 4,472,937 A | 9/1984 | Isamu | |
| 4,498,294 A | 2/1985 | Everett | |
| 4,538,415 A * | 9/1985 | Lebecque | 60/639 |
| 4,674,281 A | 6/1987 | Kim et al. | |
| 4,715,182 A | 12/1987 | Adams | |
| 4,718,232 A | 1/1988 | Willmouth | |
| 4,720,976 A | 1/1988 | Kim et al. | |
| 4,726,188 A | 2/1988 | Woolfolk | |
| 5,426,332 A * | 6/1995 | Ullman et al. | 290/53 |
| 5,430,333 A | 7/1995 | Binford et al. | |
| 5,552,657 A | 9/1996 | Epstein et al. | |
| 5,578,889 A | 11/1996 | Epstein | |
| 5,753,978 A | 5/1998 | Lee | |
| 5,944,480 A * | 8/1999 | Forrest | 415/5 |
| 5,996,344 A | 12/1999 | Frenette et al. | |

(Continued)

FOREIGN PATENT DOCUMENTS

FR 2 262 738 3/1974

(Continued)

*Primary Examiner*—Hoang Nguyen
(74) *Attorney, Agent, or Firm*—Williamson Intellectual Property Law, LLC; Thomas R. Williamson, III

(57) ABSTRACT

A sealed-shaft gravity-buoyancy energy system and method of use thereof, wherein a wheel is powered by ball masses which fall under gravitational force, thereby causing the wheel to rotate. The ball masses are collected and inserted into a fluid shaft, wherein the fluid shaft comprises at least two separate columns having valves at the ends thereof to provide a sealing function, thereby preventing fluid loss. Buoyant force raises the ball masses to the top of the device, wherein the ball masses are deposited once again onto the wheel. A generator or other device utilizes the rotational force of the wheel to create energy.

18 Claims, 11 Drawing Sheets

U.S. PATENT DOCUMENTS

| | | |
|---|---|---|
| 6,009,707 A | 1/2000 | Alkhamis |
| 6,249,057 B1 | 6/2001 | Lehet |
| 6,305,165 B1 | 10/2001 | Mizuki, Sr. |
| 6,546,726 B1 | 4/2003 | Tomoiu |

FOREIGN PATENT DOCUMENTS

| | | |
|---|---|---|
| JP | 56-6865 | 1/1981 |

* cited by examiner

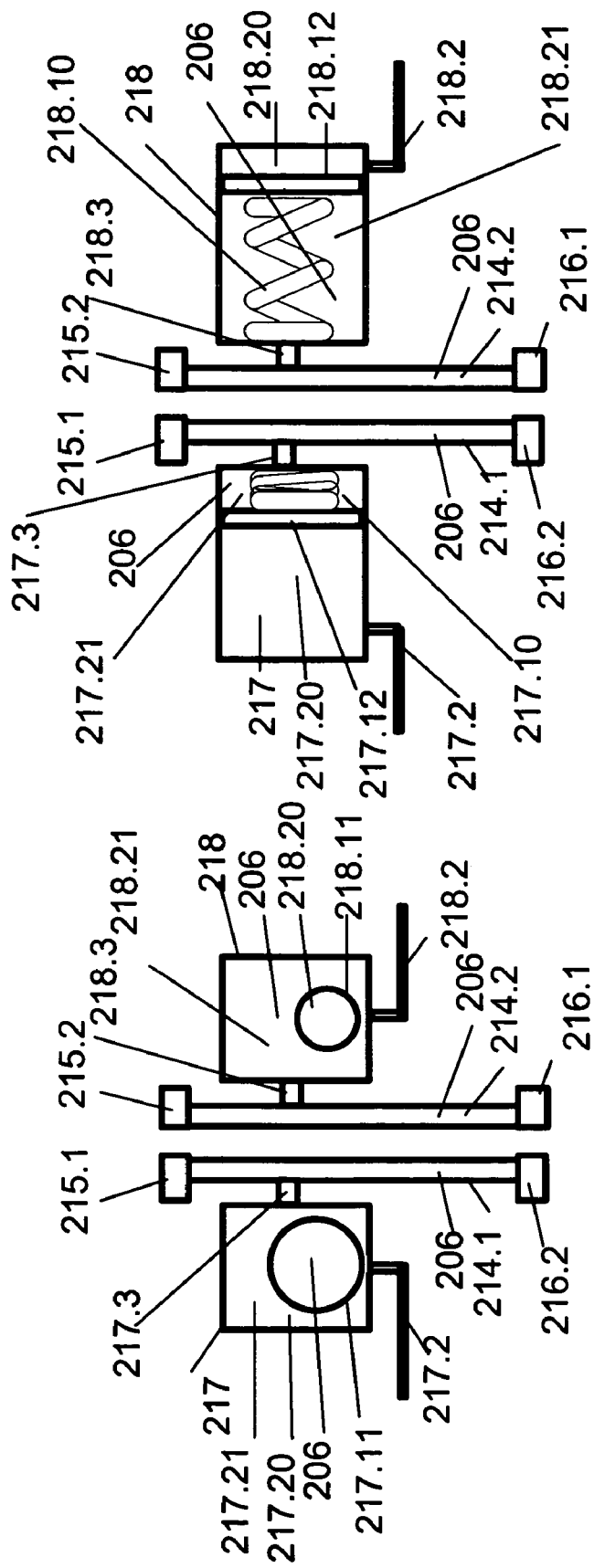

SEALED SHAFT GRAVITY BUOYANCY ENERGY SYSTEM AND METHOD OF USE THEREOF

CROSS-REFERENCE AND PRIORITY CLAIM TO RELATED APPLICATIONS

To the fullest extent permitted by law, the present non-provisional patent application claims priority to, and the full benefit of, non-provisional patent application entitled "Gravity Buoyancy Energy Generator", filed on Apr. 13, 2004, having assigned Ser. No. 10/822,963. A request pursuant to 37 C.F.R. §1.53(c) (2) has been filed to convert application Ser. No. 10/822,963 to a provisional application. Further, to the fullest extent permitted by law, the present non-provisional patent application claims priority to, and the full benefit of provisional patent application entitled "Gravity Buoyancy Energy Generator", filed on May 6, 2004, having assigned Ser. No. 60/568,554, to provisional patent application entitled "Sealed Shaft Gravity Buoyancy Energy Generator", filed on May 18, 2004, having assigned Ser. No. 60/572,082, and to provisional patent application entitled "Sealed Shaft Gravity Buoyancy Energy Generator", filed on Jun. 1, 2004, having assigned Ser. No. 60/576,067.

TECHNICAL FIELD

The present invention relates generally to energy generating apparatuses, and more specifically to a sealed-shaft gravity-buoyancy energy system and method utilizes buoyant principles to lift masses to a selected height for subsequent use in gravitationally driving an energy generating mill.

BACKGROUND OF THE INVENTION

As concerns about our nation's dependence on foreign oil increase, and as Americans become more aware of the environmental impacts of foreign petroleum use in the environment and the economy of the country, interest in alternative energy sources, such as, domestically produced alternative fuels, and wind, solar, and geothermal production energy is increasing for fueling of the transportation engines as well as generation of electrical energy.

Natural force energy, such as wave energy and energy produced from gravitational and buoyant forces are also finding interest. Various devices and methods have been developed that utilize natural forces to provide power. For instance, U.S. Pat. No. 5,753,978 to Chih-Chiang teaches powering of two sets of fluid pumps to pump fluid to the top of fluid tanks, two sets of conveyors to transfer floaters (balls), two sets of hydraulic cylinders to insert balls into the two fluid tanks, and the operation of a set of two double-wall airtight gates. The principal difficulty with pumping devices, such as that of Chih-Chiang '978, is the need to raise the fluid head, thereby requiring a large expenditure of energy and further causing a pause in the operation; that is, an undesired idle time.

U.S. Pat. No. 3,857,242 to Gilmore discloses cylinders and chains connected weights. Gilmore '242 exhibits the difficulties of maintaining a seal between the air and fluid media, and does not teach a means for hermetically sealing the buoyancy shaft, while allowing the transportation of the weights up the shaft.

Other devices utilize buoyant objects in concert with wave motion to produce energy via piezoelectric means, such as is taught by U.S. Pat. No. 5,578,889 to Epstein. However, such devices are limited to use where waves are generated or otherwise available.

Therefore, it is readily apparent that there is a need for an energy generating system and method of use thereof, wherein the system effectively and efficiently utilizes buoyant and gravitational forces, thereby overcoming the aforementioned disadvantages of having to raise fluids to a substantial head height, sealing difficulties, and/or requiring a source of wave motion.

BRIEF SUMMARY OF THE INVENTION

Briefly described, in a preferred embodiment, the present invention overcomes the above-mentioned disadvantages and meets the recognized need for such an invention, by providing a sealed-shaft gravity-buoyancy energy system and method of use thereof, wherein the present system and method generates utilizing the forces of gravity and buoyancy to generate energy that is converted directly into electrical power or into rotational energy for pumping fluids, powering boats and other uses. Through effective and efficient use of natural gravitational and buoyant forces, the present invention offers the ability of stabilizing a growing national addicted dependency on foreign oil, as well as creating a new energy generating industry.

According to its major aspects and broadly stated, the present invention in its preferred form is a sealed-shaft gravity-buoyancy energy system and method of use thereof, wherein a wheel is powered by ball masses which fall under gravitational force, thereby causing the wheel to rotate. The ball masses are collected and inserted into a fluid shaft, wherein the fluid shaft comprises at least two separate columns to provide a negative prime as detailed hereunder, and sealing of the fluid shaft so as to prevent fluid loss. Buoyant force raises the ball masses to the top of the device, wherein the ball masses are deposited once again onto the wheel. The amount of power and energy generated is directly proportional to the number of weighted masses loaded onto spokes of the wheel, as well as the weight of the masses and the length of the wheel spokes. A generator, air compressor or other device utilizes the rotational force of the wheel to create energy. The energy produced may subsequently be stored in batteries, stored as hydrogen through electrolysis, stored as compressed air, or utilized to manufacture synthetic fuels. Fluids, such as water, can also be pumped to an elevated reservoir for later use as pumped storage.

Although the invention is particularly advantageous for generating electricity, it may also be utilized to provide mechanical power, such as for pumping fluid directly for field irrigation, or pumping of fluid from a well.

More specifically, the present invention is a sealed-shaft gravity-buoyancy energy system and method of use thereof, wherein gravity and buoyancy are utilized to rotate a wheel that in turn rotates a shaft. Some energy is utilized for adjusting the fluid volume in the fluid shafts. The device overcomes the difficulties encountered in sealing the buoyancy shaft by utilizing two columns and associated tanks to transfer fluid by injecting air in and out of two diaphragm-defined chambers inside the tanks, wherein utilization of such diaphragm-defined chambers is more energy efficient than pumping fluid. The sealed shaft and the diaphragm tanks allow a negative pressure in the shaft, wherein atmospheric pressure maintains the height of fluid therein and permits the insertion of weighted masses into the stages of the process, whilst maintaining fluid levels within limits at the entry location and the exit location of the masses from the shaft.

Accordingly, a feature and advantage of the present invention is its ability to generate energy.

Another feature and advantage of the present invention is its ability to be utilized for stationary or motive power generation.

Still another feature and advantage of the present invention is its ability to be easily sized to different power and/or energy requirements.

Yet another feature and advantage of the present invention is its use of readily available materials and components.

Yet still another feature and advantage of the present invention is that it reduces, and potentially avoids depletion of non-renewable energy sources.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which:

FIG. 11 is a relational diagram (layout) of displacement volume tanks of a sealed-shaft gravity-buoyancy energy system according to an alternate embodiment of the present invention; and FIG. 12 is a relational diagram (layout) of displacement volume tanks of a sealed-shaft gravity-buoyancy energy system according to an alternate embodiment of the present invention.

DETAILED DESCRIPTION OF THE PREFERRED AND SELECTED ALTERNATIVE EMBODIMENTS

Figure 1:
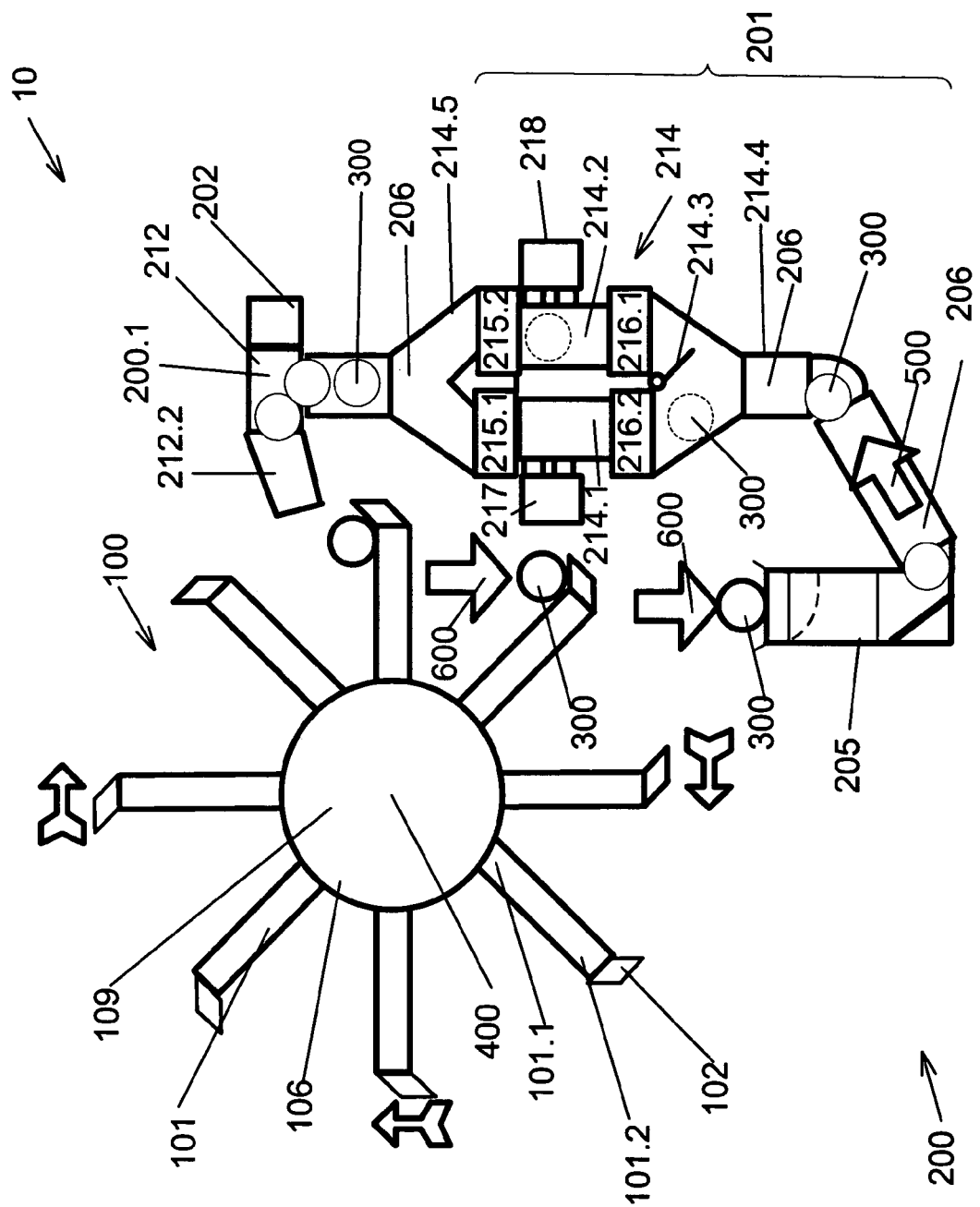
FIG. 1 is a side plan view of a sealed-shaft gravity-buoyancy energy system according to a preferred embodiment of the present invention.

In describing the preferred and selected alternate embodiments of the present invention, as illustrated in FIGS. 1–12, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1–9, the present invention in a preferred embodiment is gravity-buoyancy generator 10 comprising wheel 100, electrical generator 400, balls 300, collector box 205, and buoyancy shaft 200, wherein collector box 205 and buoyancy shaft 200 have fluid 206 disposed therewithin. Buoyancy shaft 200 comprises hermetically-sealed double-shaft box 214, first tank 217, and second tank 218.

Referring now more particularly to FIG. 1, wheel 100 comprises spoke arms 101 having first ends 101.1 and second ends 101.2, wherein first ends 101.1 are fixably attached normal to hub 106 such that second ends 101.2 extend outwardly. Spoke arms 100 have cups 102 disposed at second ends 101.2 thereof. First ends 101.1 are fixably attached to hub 106.

Figure 2:
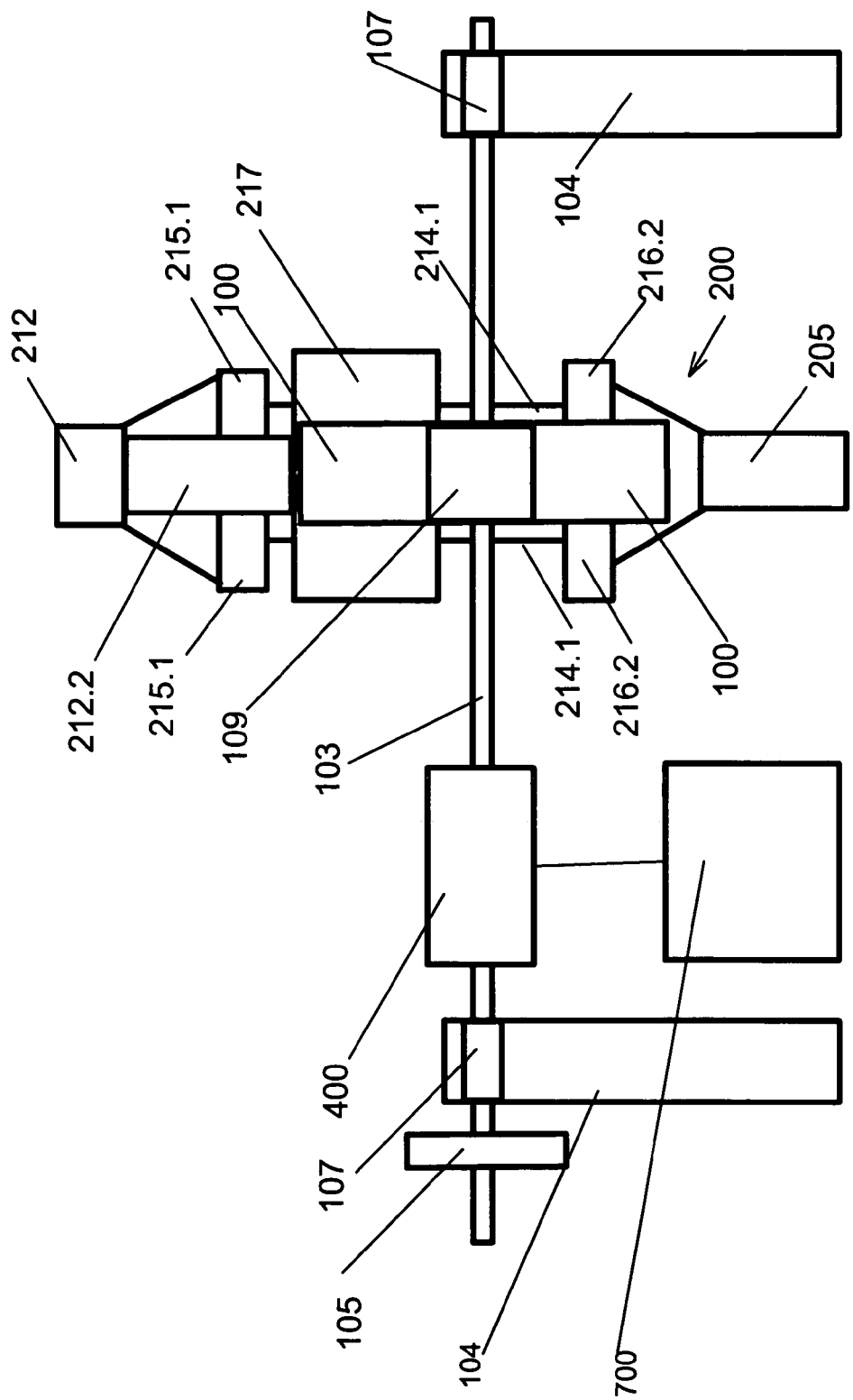
FIG. 2 is a front plan view of a sealed-shaft gravity-buoyancy energy system according to a preferred embodiment of the present invention.

Referring now to FIG. 2, wheel 100 is fixably disposed upon axial shaft 103, wherein rotation of wheel 100 causes concurrent rotation of axial shaft 103. Axial shaft 103 and wheel 100 are supported by support pillars 104, wherein support pillars 104 have bearings 107 disposed therein, and wherein axial shaft 103 is rotationally carried by bearings 107. Gear 105 is fixably disposed upon axial shaft 103 and driven thereby, wherein gear 105 can be utilized to provide mechanical power and energy as required.

Electrical generator 400 is in rotational communication with axial shaft 103, wherein axial shaft 103 drives electrical generator 400. Electrical generator 400 is in electrical communication with energy storage device 700, wherein electrical energy generated by electrical generator 400 is stored for subsequent use in energy storage device 700. In lieu of storing electrical energy in energy storage device 700, energy generated by system 10 may be directly utilized for any electrical-power-requiring device. Both gear 105 and electrical generator 400 could be clutched to all disconnect from axial shaft 103.

Figure 3:
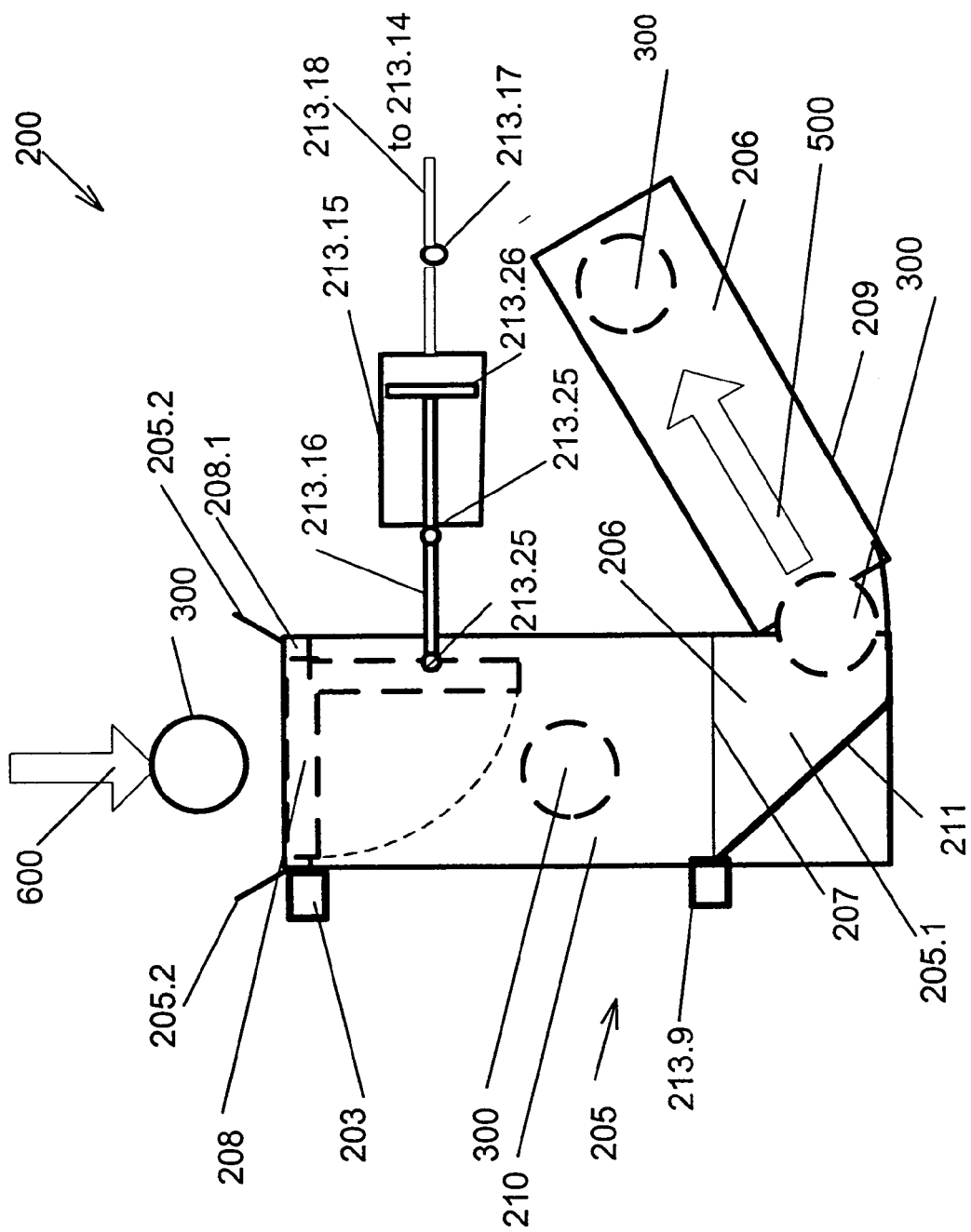
FIG. 3 is a detailed plan view of a weight collector box component of a sealed-shaft gravity-buoyancy energy system according to a preferred embodiment of the present invention.

Referring now more specifically to FIG. 3, collector box 205 comprises sensor 203, dry gate hinge 208.1, dry gate 208, dry chamber 210, fluid 206, doorstop 211 and fluid level sensor 213.9. Collector box 205 comprises guides 205.2, wherein guides 205.2 facilitate and direct entry of balls 300 into collector box 205. Collector box 205 is in fluid communication with entry chamber 209 of buoyancy shaft 200, wherein entry chamber 209 has fluid 206 contained therewithin. Dry gate 208 is pivotally attached to arm 213.16, wherein arm 213.16 moves piston 213.26 within cylinder 213.15. Air within cylinder 213.15 is expelled through one-way valve 213.17 and is stored within tank 213.14. Cylinder 213.15, piston 213.26, arm 213.16 and one-way valve 213.17 provide for capture storage of additional energy in the form of air pressure as balls 300 fall into collector box 205 via dry gate 208. However, dry gate 208, cylinder 213.15, piston 213.26, arm 213.16 and one-way valve 213.17 may be selectively utilized in the practice of the present invention.

Figure 5:
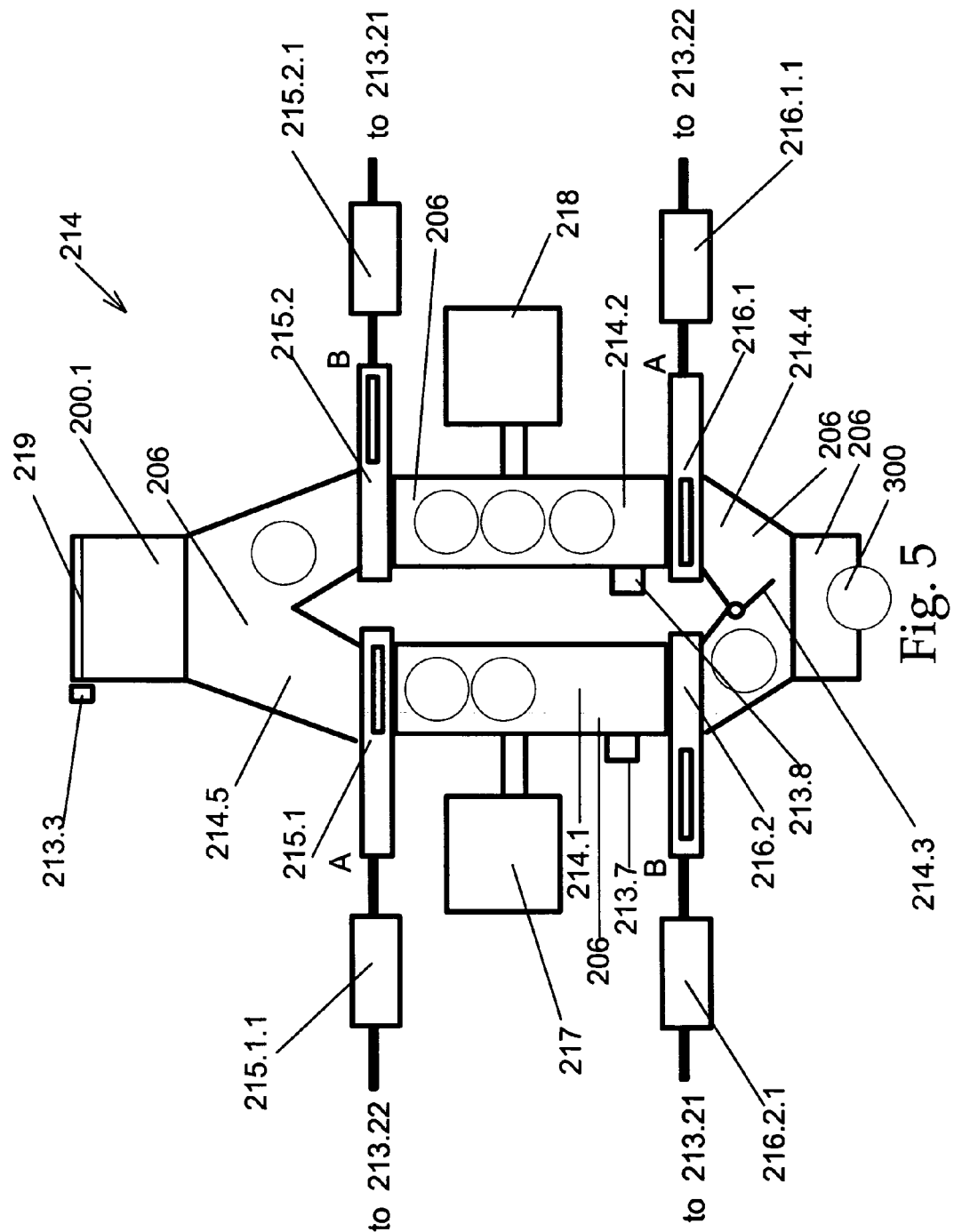
FIG. 5 is a cross-sectional view of a hermetically-sealed box component of a sealed-shaft gravity-buoyancy energy system according to a preferred embodiment of the present invention.
Figure 6:
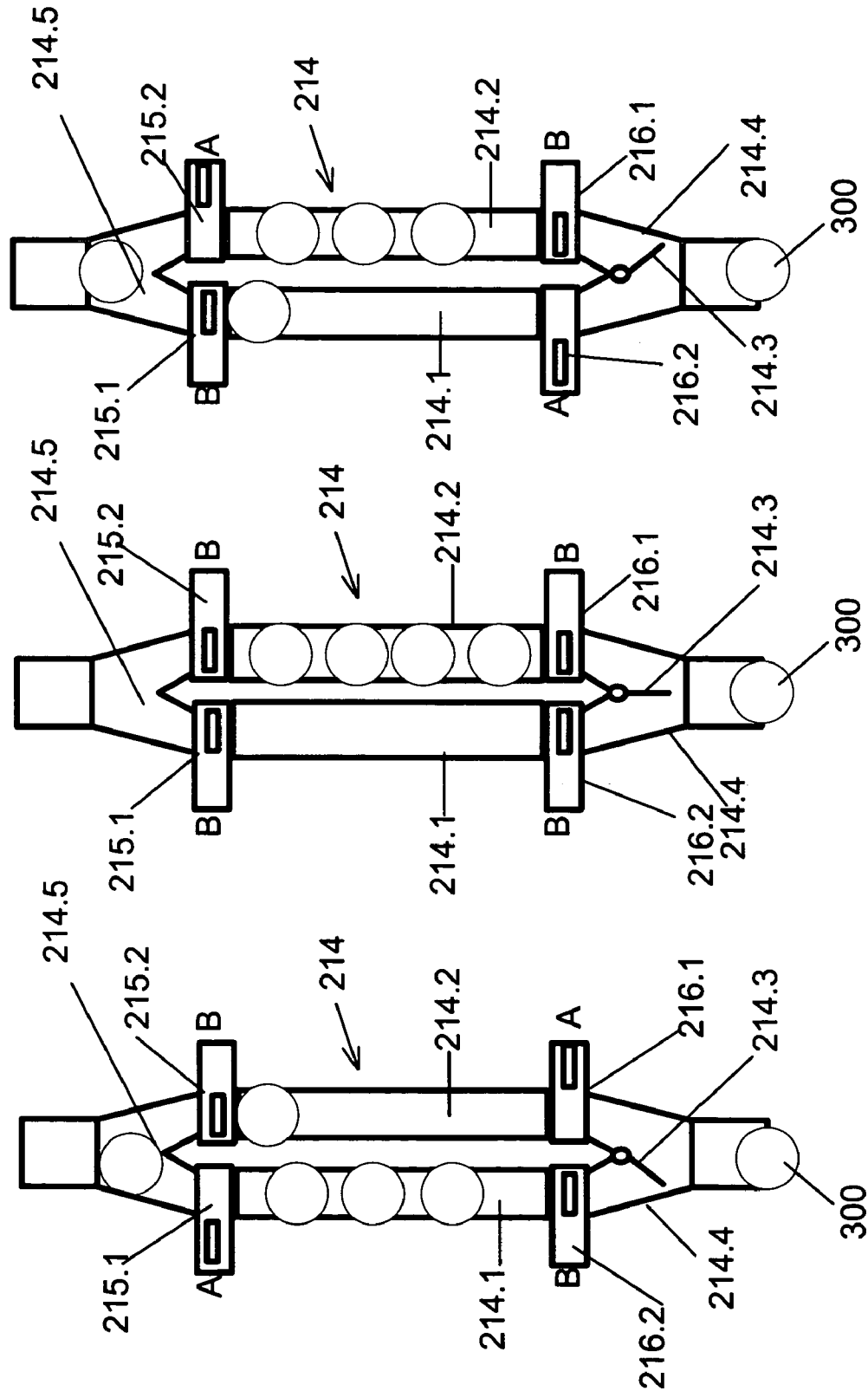
FIG. 6a is the first stage of a cross-sectional sequence diagram of a hermetically-sealed box component of a sealed-shaft gravity-buoyancy energy system according to a preferred embodiment of the present invention, showing a first buoyancy column in the "emptying mode" and a second buoyancy column in the "collecting mode"
FIG. 6b is the second stage of a cross-sectional sequence diagram of a hermetically-sealed box component of a sealed-shaft gravity-buoyancy energy system according to a preferred embodiment of the present invention, showing both a first and second buoyancy column in the "sealed mode"
FIG. 6c is the third stage of a cross-sectional sequence diagram of a hermetically-sealed box component of a sealed-shaft gravity-buoyancy energy system according to a preferred embodiment of the present invention, showing first buoyancy column in the "collecting mode" and second buoyancy column in the "emptying mode"

Referring now more particularly to FIG. 5, in addition to entry chamber 209 (best shown in FIG. 3), buoyancy shaft 200 comprises hermetically-sealed double-shaft box 214, first tank 217, second tank 218 and top 200.1, wherein top 200.1 comprises level 219 of fluid 206, and fluid level sensor 213.3. Hermetically-sealed double-shaft box 214, first tank 217, and second tank 218 have fluid 206 contained therewithin. Hermetically-sealed double-shaft box 214 comprises dividing section 214.4, first column 214.1, second column 214.2 and joining section 214.5, wherein dividing section comprises flapper 214.3, and wherein flapper 214.3 is pivotally engaged to dividing section 214.4.

First column 214.1 comprises first optical sensor-counter 213.7, first upper slicegate valve 215.1 and first lower slicegate valve 216.2, wherein first column 214.1 is delimited by first upper slicegate 215.1 and first lower slicegate 216.2. Second column 214.2 comprises second optical sensor-counter 213.8, second upper slicegate valve 215.2 and second lower slicegate valve 216.1, wherein second column 214.2 is delimited by second upper slicegate 215.2 and second lower slicegate 216.1. During operation, slicegate valves are independently-operable via slicegate drive members 215.1.5, wherein valves 215.1 and 216.2 can be opened or closed to seal or open column 214.1, and wherein slicegate valves 215.2 and 216.1 can be opened or closed to seal or open column 214.2.

Figure 7:
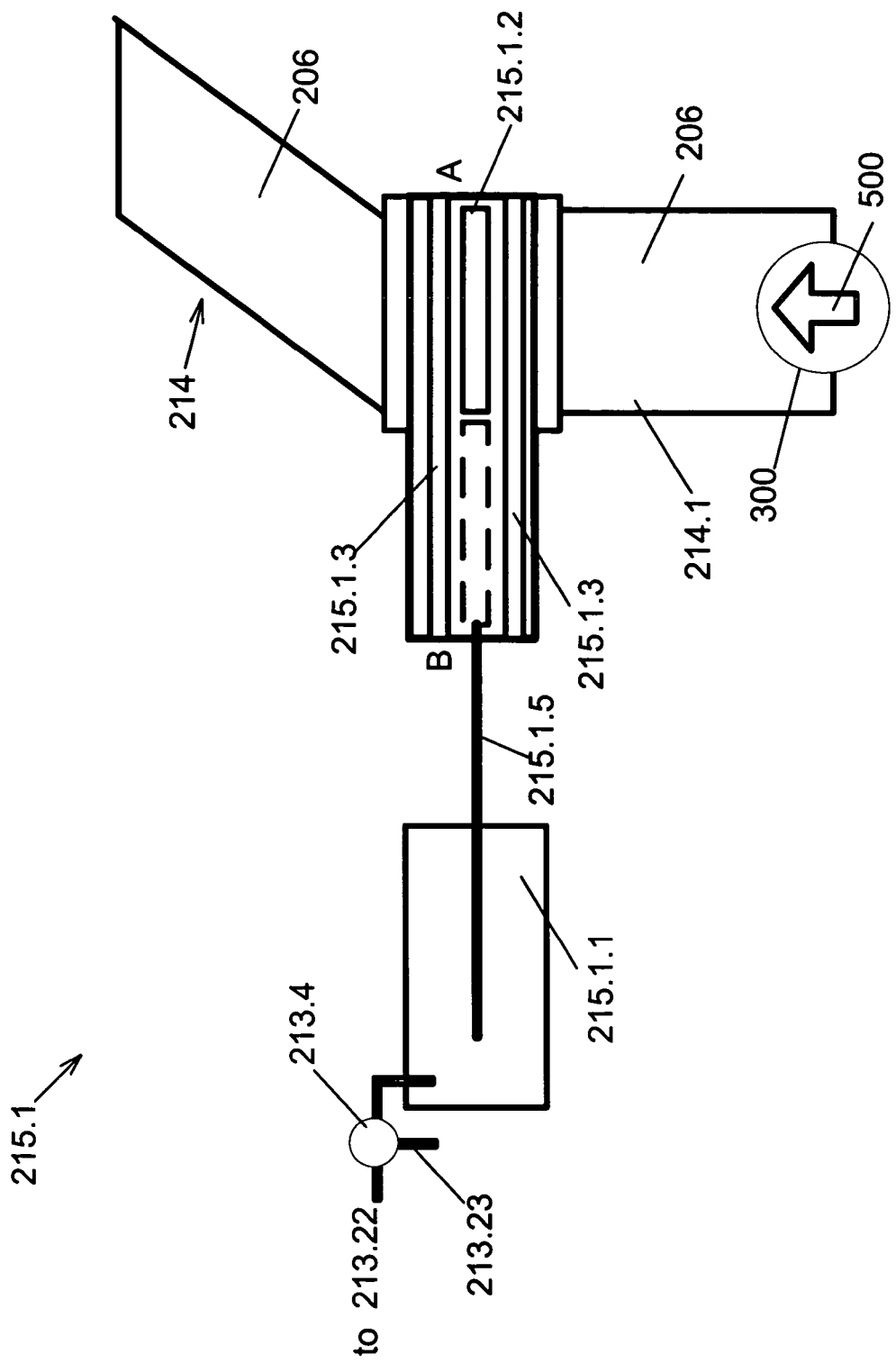
FIG. 7 is detail cross-sectional view of a slicegate valve component of a sealed-shaft gravity-buoyancy energy system according to a preferred embodiment of the present invention.

Referring now more specifically to FIG. 7, operation of slicegate valve 215.1 is shown in detail to facilitate understanding of the operation of all slicegate valves 215.1, 215.2, 216.1 and 216.2. Slicegate valve comprises spring return air actuator 215.1.1, valve plate 215.1.2, seal 215.1.3, and drive member 215.1.5, wherein spring return air actuator 215.1.1 is in mechanical communication with valve plate 215.1.2 via drive member 215.1.5. In position A, slicegate valve 215.1 blocks seal 215.1.3, closing column 214.1, and in position B, slicegate valve 215.1 unblocks seal 215.1.3, thereby opening column 214.1 and permitting ball 300 to rise through slicegate valve 215.1 under buoyant force 500. Spring return air actuator 215.1.1 is activated via air valve 213.4. Although not shown in detail, slicegate valves 215.2, 216.1 and 216.2 have similar spring return air actuators, valve plates, seals and drive members as slicegate valve 215.1 and are operated the same as slicegate valve 215.1.

Figure 8:
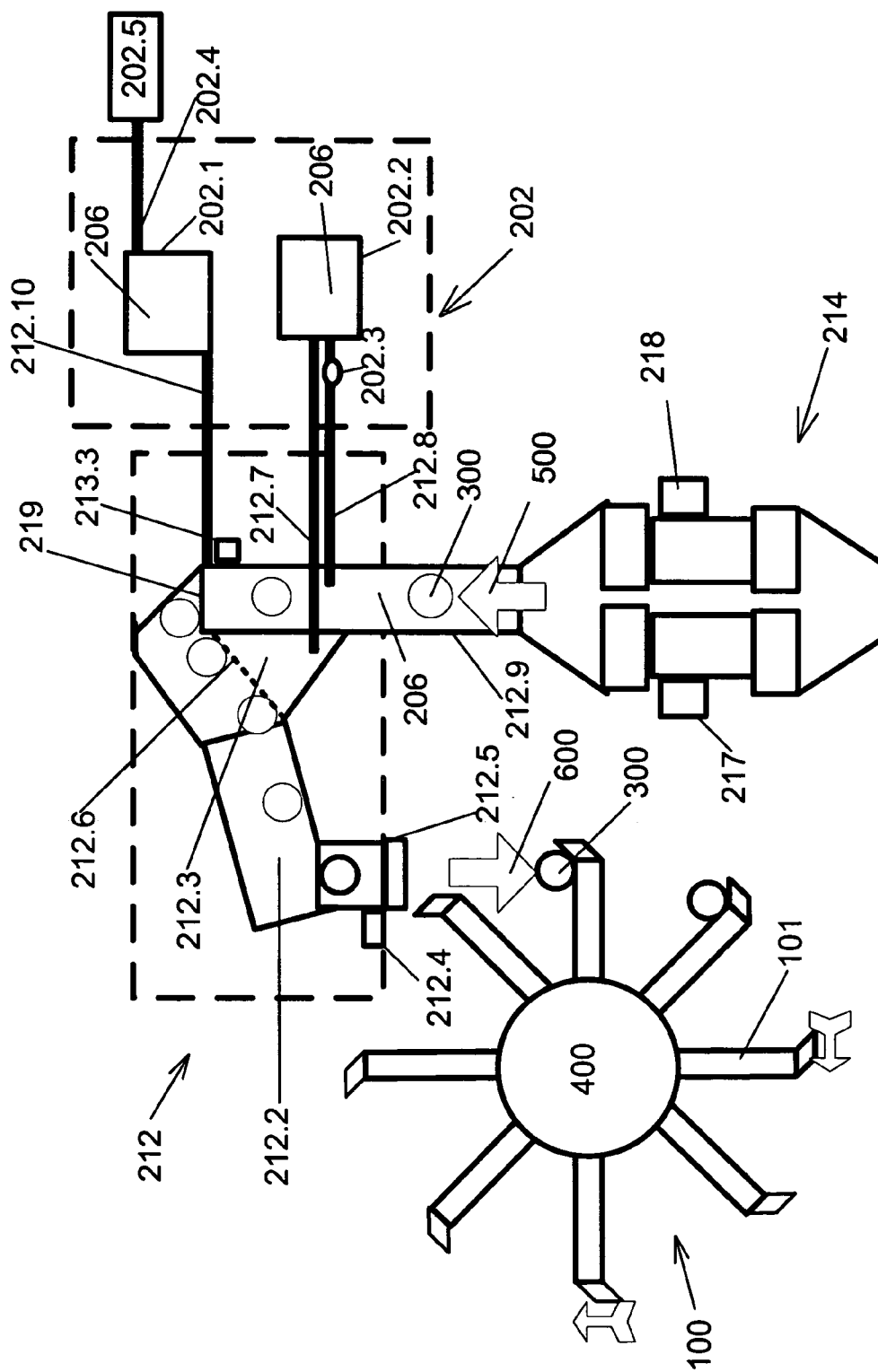
FIG. 8 is a partial side cross-sectional view of a top section of a sealed-shaft gravity-buoyancy energy system according to a preferred embodiment of the present invention.

Referring now to FIG. 8, wherein fluid volume regulator 202 and timing mechanism 212 are shown in more detail, fluid volume regulator comprises fluid feeder 202.1, fluid level control tank 202.2, and fluid return pump 202.3. Timing mechanism 212 is disposed within or on top 200.1 of buoyancy shaft 200, wherein timing mechanism 212 comprises ball feeder 212.2, overflow shaft 212.3, spoke proximity sensor 212.4 and release mechanism 212.5.

Figure 9:
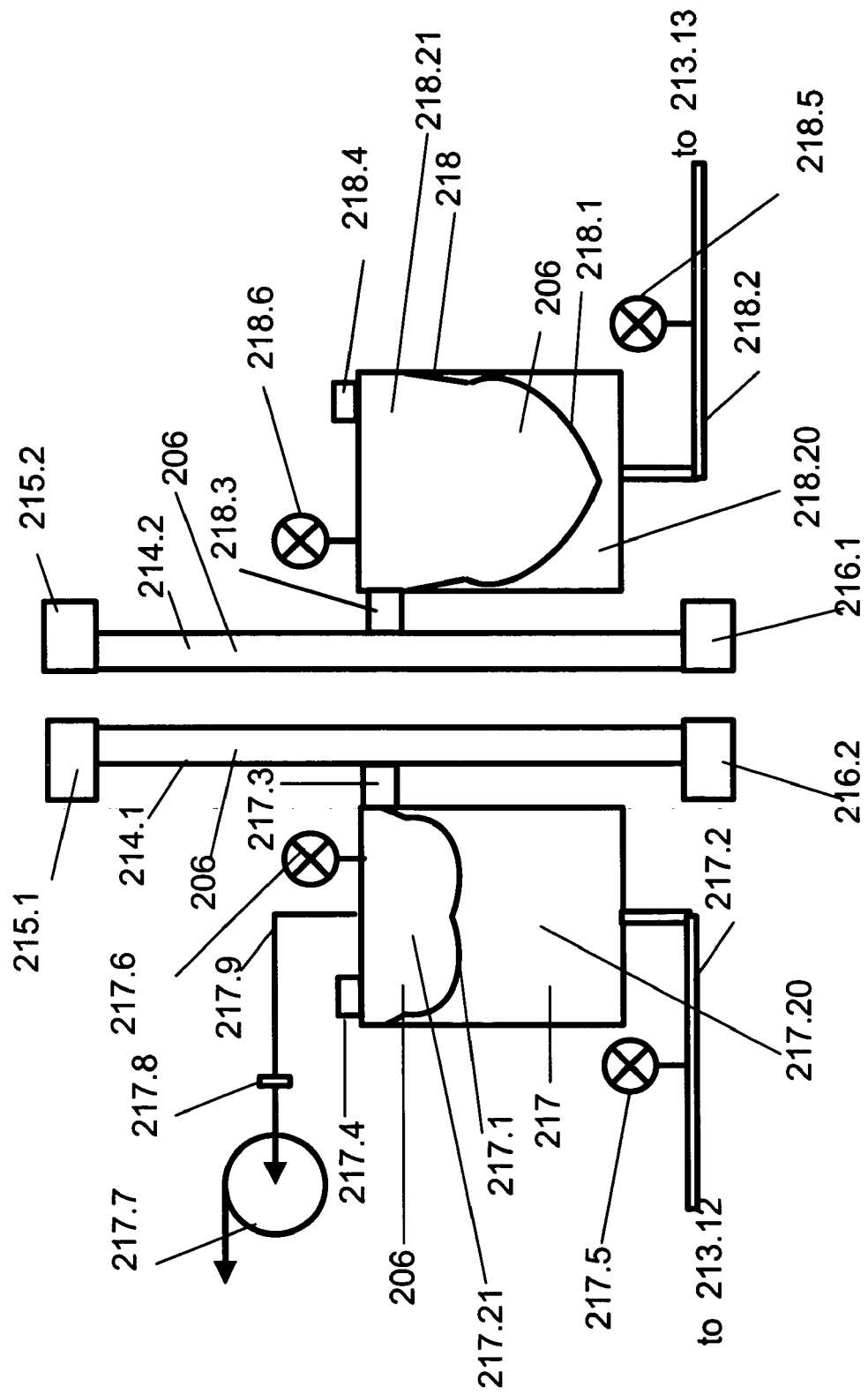
FIG. 9 is a relationship diagram (layout) of displacement volume tanks of a sealed-shaft gravity-buoyancy energy system according to a preferred embodiment of the present invention.

Referring now to FIG. 9, first tank 217 comprises first tank gauge 217.6 in fluid communication therewith and first diaphragm 217.1 disposed therewithin, wherein first diaphragm 217.1 is moved via air entering first drive chamber 217.20 via first control air line 217.2. First diaphragm 217.1 comprises a resilient elastic material. First control air line 217.2 comprises first gauge 217.5 in fluid communication therewith. Addition of air to first drive chamber 217.20 causes movement of first diaphragm 217.1 displacing fluid 206 in first fluid chamber 217.21 out of first tank 217 via first connector pipes 217.3, wherein displaced fluid 206 enters first column 214.1, and wherein first tank 217, first column 214.1, and first connector pipes 217.3 are in fluid communication with one another. Second tank 218 comprises second tank gauge 218.6 in fluid communication therewith and second diaphragm 218.1 disposed within second tank 218, wherein second diaphragm 218.1 is is moved via air entering second drive chamber 218.20 via second control air line 218.2. Second diaphragm 218.1 comprises a resilient elastic material. Second control air line 218.2 comprises second gauge 218.5 in fluid communication therewith. Addition of air to second drive chamber 218.20 causes movement of second diaphragm 218.1 displacing fluid 206 in second fluid chamber 218.21 out of second tank 218 via second connector pipes 218.3, wherein displaced fluid 206 enters second column 214.2, and wherein second tank 218, second column 214.2, and second connector pipes 218.3 are in fluid communication with one another. First tank 217 further comprises first start-up plug 217.4 and second tank 218 further comprises second start-up plug 218.4.

First tank 217 further comprises air pump 217.7 and air valve 217.8, wherein air pump 217.7 and air valve 217.8 are utilized for priming gravity-buoyancy generator 10 during start-up. Air pump 217.7 and air valve 217.8 are in fluid communication with tank 217 via air line 217.9.

Figure 4:
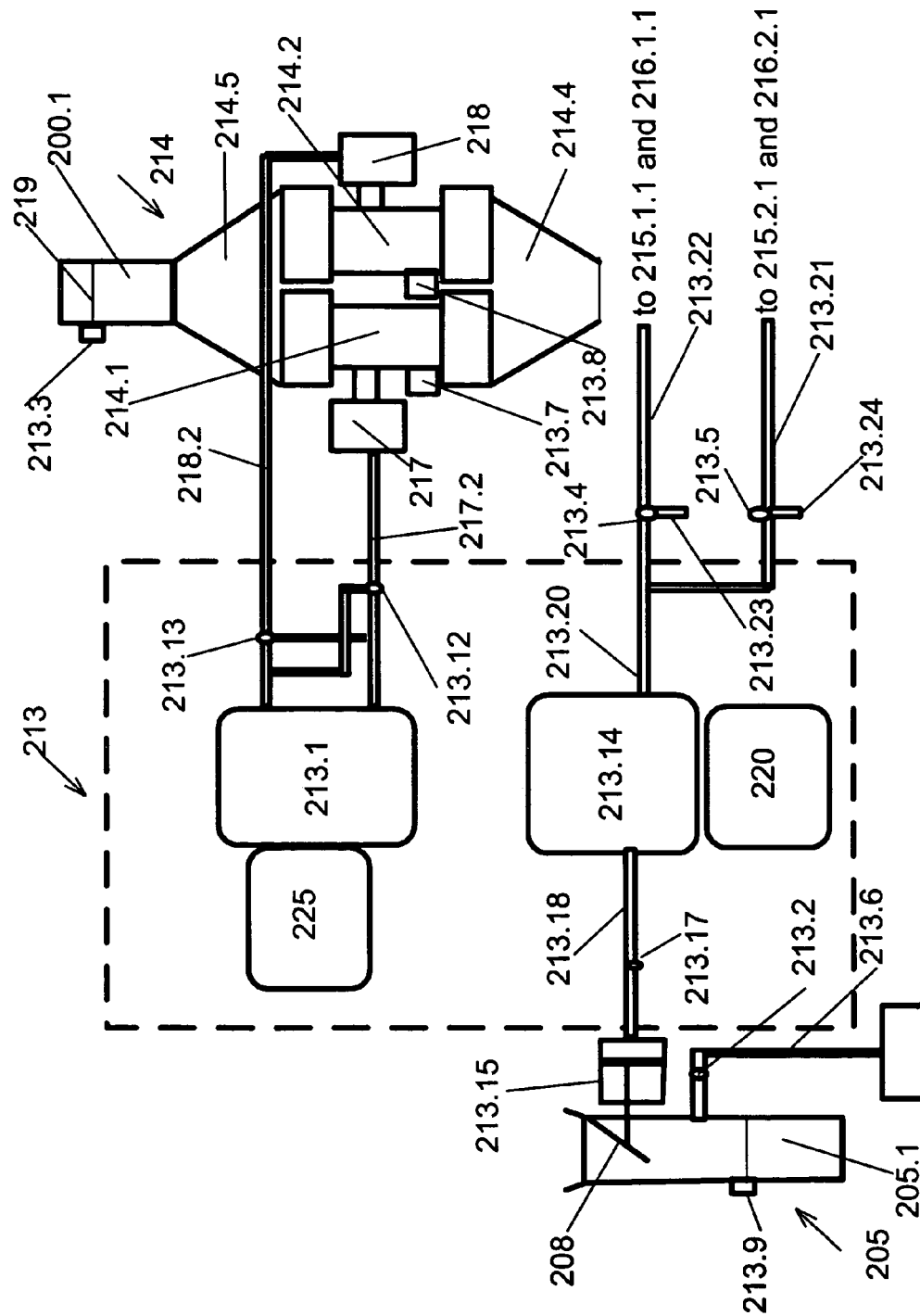
FIG. 4 is detail plan view of apparatus controls of a sealed-shaft gravity-buoyancy energy system according to a preferred embodiment of the present invention.

Referring now more specifically to FIG. 4, wherein controls for diaphragm timing device 213 are shown in detail, diaphragm timing device 213 comprises controller 220, air pump 213.1 having variable speed controller 225, fluid supply valve 213.2, buoyancy shaft fluid level sensor 213.3, second control valve 213.4, first control valve 213.5, fluid supply line 213.6, first column optical sensor/counter 213.7, second column optical sensor/counter 213.8, collector box fluid level sensor 213.9, door position sensor air valve 213.11, first three-way valve 213.12 and second three-way valve 213.13.

Operation of air pump 213.1 is controlled to be proportional to rotational speed of wheel 100 via variable speed controller 225, and further, in response to signals from 213.3 and 213.9, controller 220 activates air pump 213.1 and selectively directs first three-way valve 213.12, second three-way valve 213.13, second control valve 213.4 and first control valve 213.5 to transfer air between diaphragms 217.1 and 218.1 in order to maintain fluid 206 at pre-determined level 207 within collector box 205 and maintain fluid 206 at pre-determined level 219 within buoyancy shaft 200. As balls 300 enter collector box 205, fluid level therewithin increases, wherein the increase is sensed by collector box fluid level sensor 213.9. Consequently, sensor 213.9 sends signal to controller 220 to reduce quantity of fluid 206 in collector box 205 by increasing air in drive chamber 217.20 or 218.20, depending on which column 214.1 or 214.2, respectively, is currently open to collector box 205. In the event of evaporative losses of fluid 206 below level 207, additional fluid 206 is added by opening fluid supply valve 213.2 to permit entry of fluid 206 from fluid supply 202.5.

Bottom 205.1 of collector box 205 is in fluid communication with buoyancy shaft 200 via entry chamber 209, wherein balls 300, passing through dry gate 208, forcefully enter fluid 206 in bottom 205.1 of collector box 205, bounce off doorstop 211, pass into fluid 206 within entry chamber 209 and subsequently travel into buoyancy shaft 200. Doorstop 211 is suitably angled to direct balls 300 into entry chamber 209, wherein doorstop 211 is comprised of a resilient material, such as, for exemplary purposes only, rubber. In buoyancy shaft 200, balls 300 rise due to buoyant force 500 in fluid 206.

Referring collectively now to FIGS. 1 and 8, in operation of gravity-buoyancy generator 10, buoyant force 500 and gravitational force 600, provide rotational motion of wheel 100. Balls 300 are dynamically transported in a repetitive or cyclical fall and rise fashion through gravity-buoyancy generator 10 so as to create axial rotation of wheel 100, thereby turning axial-shaft 103.

Balls 300 are deposited at a rate proportional to the amount of energy required via timing mechanism 212 from top 200.1 of buoyancy shaft 200 onto cups 102, wherein cups 102 are disposed at second ends 101.2 of wheel spoke arms 101. The generated horsepower and energy is a function of the revolutions per minute and the torque developed by the total weights on the wheel.

Balls 300 are preferably of a selected dimension to fit buoyancy shaft 200, and of a selected size and material such that the density of balls 300 is less than that of fluid 206, thereby providing desired buoyant force 500. The total number of balls required for the process is approximately equal to the total ball capacity of buoyancy columns 214.1 and 214.2 plus half the number of spoke arms 101 on the wheel.

Balls 300, under gravitational force 600, exert downward force on spoke arms 101, causing rotation of wheel 100, wherein wheel 100 subsequently rotates axial shaft 103. Axial shaft 103 is in rotational communication with electrical generator 400 and/or gear mechanism 105, thereby selectively providing electrical and/or mechanical power. As wheel 100 rotates, spoke arm 101 moves past spoke proximity sensor 212.4, wherein spoke proximity sensor 212.4 signals timing mechanism 212 to release next ball 300

While maximum process speed, and thereby power delivered via rotation of wheel 100, is limited by gravity and buoyancy forces, timing mechanism 212 regulates process speed and initiates cyclic operation of sealed shaft gravity-buoyancy generator 10, wherein timing mechanism 212 comprises spoke proximity sensor 212.4. Spoke proximity sensor 212.4 can be any suitable sensor known in the art, such as, for exemplary purposes only, an optical, magnetic, hydraulic, electrical, electronic and/or mechanical sensor. Spoke proximity sensor 212.4 releases next ball 300, wherein release of ball 300 causes a decrease in level 219 due to the loss of mass of ball 300, wherein spoke proximity sensor 212.4 initiates fluid control within buoyancy shaft 200 via air tanks 217 and 218 to compensate for loss of ball 300. Entry of new ball 300 from collector box 205 into entry shaft 209 has the opposite effect, requiring a reduction in volume to compensate for the increased mass of added ball 300 in buoyancy shaft 200.

Accordingly, fluid volume is controlled via fluid volume regulator 202, wherein fluid volume regulator 202 is disposed at top 200.1 of buoyancy shaft 200. Fluid volume regulator 202 maintains the supply of fluid 206 to buoyancy shaft 200 via fluid feeder 202.1, and fluid level control tank 202.2, wherein fluid level control tank 202.2 receives overflow and drag-out of fluid 206 from overflow shaft 212.3 and returns fluid 206 back to buoyancy shaft 200 via fluid return pump 202.3. Fluid feeder 202.1 provides makeup fluid 206 receiving same from fluid supply 202.5 via fluid supply line 202.4.

At the end of rotation, ball 300 releases from cup 102 and drops into weight collector box 205, wherein momentum causes ball 300 to pass sequentially through gate 208, returning ball 300 to hermetically-sealed double-shaft box 214 via entry shaft 209, and wherein ball 300 is carried upwards within hermetically-sealed double-shaft box 214 to ascend to top 200.1 of shaft 200 by buoyant force 500 created by displacement of the volume of ball 300 in fluid 206 (Archimedes Law), traveling selectively through either first buoyancy column 214.1 or second buoyancy column 214.2 and ascending to top 200.1 to be dropped again by timing mechanism 212. Buoyancy columns 214.1 and 214.2, and tanks 217, 218 provide operational switching within buoyancy shaft 200, closing buoyancy column 214.1 while buoyancy column 214.2 is open and vice versa, wherein buoyancy column 214.1 allows the transit of balls 300 to top 200.1, and wherein a steady level 207 of fluid is maintained within collector box 205. Fluid level within buoyancy shaft 200 is maintained through tanks 217 and 218, wherein tanks 217 and 218 adjust for fluid volumes by increasing or decreasing fluid 206 in column 214.1 and 214.2, respectively.

Referring once again to FIGS. 3, 4, 8 and 9, diaphragm timing device 213 coordinates the transfer of air from diaphragm 217.1 to 218.1, or vice versa, in a manner proportional to the number of balls 300 and the speed of the process via providing air pressure to valves 213.4 and 213.5, wherein airflow is controlled via valves 215.1, 215.2, 216.1 and 216.2.

In its closed state, gate 208 retains fluid 206 in chamber 210 and prevents spillage of fluid 206 in the event of an unscheduled release of fluid 206. However, any suitable means for retention of fluid 206 may be utilized.

Ball 300 submerges into fluid 206 at level 207 deflecting off doorstop 211, sending ball 300 into buoyancy shaft 200, wherein buoyancy shaft 200 is in communication with hermetically-sealed double-shaft box 214. Fluid 206 must be maintained at critical level 207, wherein level 207 of fluid 206 is chosen to reproducibly facilitate entry of ball 300 into hermetically-sealed double-shaft box 214.

Diaphragm timing device 213 maintains fluid level 207 in collector box 205 and controls level 219 via controlling fluid flow into and out of tanks 217 and 218. As balls 300 enter and leave hermetically-sealed double-shaft box 214, fluid flow into and out of tanks 217 and 218 via movement of diaphragms 217.1 and 218.1, adjusts fluid levels 207 and 219 by removing air from either tank 217 or 218 and injecting air into the other tank 218 or 217, respectively, thereby controlling the volume of fluid 206 in buoyancy columns 214.1 and 214.2.

Diaphragm timing device 213 provides overall control for air valves 213.4 and 213.5, wherein air valves 213.4 and 213.5 are in communication with slicegate valves 215.1, 216.1, 216.2 and 215.2, and wherein air valves 213.4 and 213.5 permit venting through exhaust ports 213.23 and 213.24 when slicegate valves 215.1, 216.1, 216.2 and 215.2 return to a relaxed mode by spring return air actuators 215.1.1, 216.1.1, 216.2.1 and 215.2.1, respectively. Air pump 213.1 comprises an electrical driven air compressor and/or tank. It should be understood that the actuation of valve 213.12, 213.13, 213.2 213.4, and 213.5 could be equally accomplished via hydraulic or electrically-driven valving devices.

The level of fluid in the collector box 205 must be kept relatively constant at the same level in order to have the same results as balls enter fluid 206 at level 207, balls 300 must enter fluid 206 diving deeply into fluid 206, wherein balls 300 simultaneously must have enough lateral motion and momentum to be sent up buoyancy shaft 200 as balls 300 rebound from doorstop 211; therefore, diaphragm timing device 213 must sense level 207 of fluid 206 as monitored by device 213.9 and maintain the correct level 207 of fluid 206 in collector box 205. If level 207 of fluid 206 is too low at bottom 205.1, then device 213 must supply fluid 206 through valve 213.2 from fluid supply 202.5 via fluid supply tube 213.6 until a desired level 207 is achieved.

Level 207 increases every time balls 300 are dropped into weight collector box 205, wherein level 219 drops every time balls 300 exit top 200.1 of buoyancy shaft 200. To adjust levels 207 and 219, fluid must be transferred from one fluid chamber 217.21 or 218.21 to the other fluid chamber 218.21 or 217.21, respectively, to stabilize the volume of fluid 206 until the active buoyancy column 214.1 or 214.2 is full with balls 300; therefore, controller 220 must sense and/or measure the quantity and rate of passing of balls 300 through buoyancy shafts 214.1 and 214.2 in device 214 via sensors 213.7 and 213.8, and controller 220 must actuate air valves 213.4 and 213.5, respectively, providing air pressure to synchronously actuate slicegate valves 215.1 and 216.1 together as a set, while slicegate valves 215.2 and 216.2 act together as a separate set. During column changeover, each set of slicegate valves 215.1, 216.2 and 215.2, 216.1 must first be closed before the other set is energized.

Fluid levels 207 and 219 are maintained by displacing fluid 206 at the respective volume tank, by movement of either diaphragm 217.1 or 218.1. By decreasing the air volume in drive chamber 217.20 or 218.20 depending upon which of first column 214.1 or second column 214.2, respectively, is closed, the level 207 of fluid 206 is lowered and vice versa. Increasing air volume in drive chamber 218.20 or 217.20 corresponding to whichever of second column 214.2 and first column 214.1 is open, level 219 of fluid 206 is raised and vice versa.

Level 207 of fluid 206 is achieved and maintained by creating negative pressure inside J-shaped vessel 201, wherein J-shaped vessel 201 comprises collector box 205 and either buoyancy column 214.1 or buoyancy column 214.2, depending upon whichever column 214.1 or 214.2 has its lower slicegate valve 216.2 or 216.1, respectively, open. Atmospheric pressure at level 207 pushes fluid 206 upwardly.

The operating process of the present system and method requires a source of compressed air to transfer air from one diaphragm into the other diaphragm, thereby controlling the fluid level at the bottom and the top of the shaft. The compressed air is further utilized to actuate various valves.

Accordingly, the preferred sequence of operation of the present invention is set forth as follows:

Pre-Start Procedure:

Prior to start-up of gravity-buoyancy generator 10, J-shaped shaft 201 is placed under negative pressure, thereby lowering level 207 of fluid 206 within collector box 205. Level 207 is lowered by filling column 214.1 and tank 217 with fluid 206 and subsequently pumping fluid out of tank 217 via priming pump 217.7 until selected level 207 of fluid 206 is achieved. Negative pressure within collector box 205 and tank 214.1 combined with atmospheric pressure at collector box 205 pushes fluid 206 upward to selected level 207.

Next, tanks 217 and 218 are primed by filling with fluid 206, column 214.2 is filled with balls 300, and buoyancy shaft 200 is filled with fluid 206 to level 219 in top 200.1.

In further detail, the pre-start procedure comprises the following steps:

A—wheel 100 is prevented from moving by setting governor/brake 109;

B—buoyancy column 214.1 is set to "collecting mode", wherein balls 300 can enter thereinto. Collecting mode is set by closing valve 215.1 and opening valve 216.2 (as best shown in FIG. 5). Column 214.2 is set to "emptying mode", wherein balls 300 rise out of column 214.2. Emptying mode is set by opening valve 215.2 and closing valve 216.1 (as best shown in FIG. 5);

C—start-up plug 217.4 is removed and drive chamber 217.20 is slightly pressurized with air from air pump 213.1, or other available air sources;

D—buoyancy column 214.1 is filled with fluid 206 to level 207 in collector box 205. Collector box 205 is sealed by closing dry gate 208, or other means, wherein buoyancy column 214.1 is subsequently filled until fluid 206 fills tank 217 within fluid chamber 217.21. Air is removed via 217.9 and valve 217.8 under suction from pump 217.7, and after evacuation of air, start-up plug 217.4 is replaced;

E—under suction from pump 217.7 via valve 217.8, dry gate 208 opens slowly, thereby retaining fluid 206 without spillage, until level 207 of fluid 206 is achieved, thereby creating a negative pressure within J-shaped vessel 201;

F—valve 217.8 is closed and pump 217.7 is de-energized;

G—buoyancy column 214.2 is filled with balls 300. Start-up plug 218.4 is removed, and air is withdrawn from drive chamber 218.20. Buoyancy column 214.2 is filled until fluid 206 fills tank 218 within fluid chamber 218.21 defined by diaphragm 218.1. Start-up plug 218.4 is replaced, and buoyancy column 214.2 and top 200.1 of buoyancy shaft 200 are filled to level 219.

H—one of balls 300 is placed on spoke 101 wheel 100;

I—balls 300 are loaded into top 200.1 until all balls 300 have been loaded;

J—fluid volume regulator 202, timing mechanism 212, diaphragm timing device 213 and controller 220 are activated; and K—flapper 214.3 is set to direct balls 300 into buoyancy column 214.1.

Following pre-start, gravity buoyancy generator 10 is started by releasing governor/brake 109, thereby permitting wheel 100 to rotate under operation of gravitational force 600 on balls 300, wherein balls 300 return to top 200.1 of buoyancy shaft 200 under buoyant force 500 and are dispensed again via timing mechanism 212 onto wheel 100.

In further detail, the steps of operation of system 10 are:

Step 1—Prior to balls 300 being processed, all slicegate valves 215.1, 215.2, 216.1 and 216.2 must be as set in pre-start procedure hereinabove.

Step 2—Ball feeder 212.2 feeds balls 300 onto spoke arms 101 of wheel 100 to start cycle in response to spoke proximity sensor 212.4.

Step 3—Wheel 100 rotates by the weight of balls 300, subsequently rotating electrical generator 400, wherein electrical generator 400 generates electrical energy. As wheel 100 rotations, balls 300 are subsequently deposited into collector box 205.

Step 4—From spoke arms 101, balls 300 fall by gravity onto collector box 205, thus opening dry gate 208 and permitting balls 300 to pass into collector box 205.

Step 5—After passing dry gate 208, balls 300 drop onto doorstop 211, wherein doorstop 211 produces a lateral momentum causing balls 300 to submerge into fluid 206 and subsequently into entry shaft 209. Fluid level 207 is raised by balls 300 entering fluid 206, wherein fluid level sensor 213.9 detects the increase in level 207 and starts removing air from drive chamber 217.21 or 218.21 to decrease fluid 206 in respective selected column 214.1 or 214.2, and adding air to drive chamber 218.21 or 217.21, respectively, to increase fluid 206 in respective column 214.2 or 214.1.

Step 6—Balls 300 travel up buoyancy shaft 200 via either first column 214.1 or second column 214.2 and ultimately ends up at top 200.1 of buoyancy shaft 200.

Step 7—If either column 214.1 or 214.2 reaches a maximum selected capacity of balls 300, then both control valves 213.4 and 213.5, respectively, are deactivated, thereby placing all slicegate valves 215.1, 215.2, 216.1 and 216.2 in the sealed shaft mode of closed position B as slicegate valves 215.1, 215.2, 216.1 and 216.2 are returned by spring return air actuators 215.1.1, 215.2.1, 216.1.1 and 216.2.1. Upon closure of slicegate valves 215.1, 215.2, 216.1 and 216.2, the appropriate column 214.1 or 214.2 is selected by energizing the respective valve device 213.4 or 213.5. In the course of operation, columns 214.1 and 214.2 alternate from "collecting mode" to "emptying mode" via positioning of slicegate valves 215.1, 215.2, 216.1 and 216.2, as best depicted by the sequence of FIGS. 6A–6C, described more fully hereinbelow.

Subsequently balls 300 ascend to top 200.1 of buoyancy shaft 200 and repeat the sequence beginning at Step 1 thereby generating electrical energy and/or rotational shaft energy.

Referring now again to FIG. 5, wherein hermetically-sealed double-shaft box 214 is shown, hermetically-sealed double-shaft box 214 comprises first column 214.1 and second column 214.2. First column 214.1 comprises first upper slicegate valve 215.1, second upper slicegate valve 215.2, second lower slicegate valve 216.1 and fist lower slicegate valve 216.2. Hermetically-sealed double-shaft box 214 provides independent alternate routes via first column 214.1 and second column 214.2 for balls 300 to ascend to joining section 214.5. Valves 215.1, 215.2, 216.1 and 216.2 are disposed at ends 214.1.1, 214.1.2 and 214.2.1, 214.2.2 of columns 214.1 and 214.2, respectively, wherein said valves 215.1, 215.2, 216.1 and 216.2 can selectively seal columns 214.1 and 214.2, and wherein said valves 215.1, 215.2, 216.1 and 216.2 provide control for maintaining negative pressure within buoyancy shaft 200, thereby maintaining selected level 207 of fluid 206 within collector box 205.

Hermetically-sealed double-shaft box 214 negates pressure developed by the head of fluid 206 within buoyancy shaft 200, yet still allows passage of balls 300 to joining section 214.5 of buoyancy shaft 200. Collector box 205, together with, alternately, first column 214.1 or second column 214.2, comprise J-shaped vessel 201, wherein J-shaped vessel 201 permits balls 300 to rise under buoyant force 500 to top 200.1 of buoyancy shaft 200. J-shaped vessel 201, when filled with fluid 206 and closed at joining section 214.5, will support fluid 206, preventing fluid 206 from exiting collector box 205 due to vacuum held at valve 215.1. Atmospheric pressure is exerted at collection box 205, thereby pressing fluid 206 upward. Level 207 of fluid 206 is maintained in collector box 205 below gate 208, thereby permitting balls 300 to enter collector box 205 without losing any fluid 206. Hermetically-sealed double-shaft box 214 via operation of valves 215.1, 215.2, 216.1 and 216.2 permits only one column 214.1 or 214.2 to be open to joining section 214.5 and one column 214.2 or 214.1 to be open to dividing section 214.4. In the event of a loss of control air, both columns 214.1 and 214.2 are closed at either of respective slicegate valves 215.1 or 216.2 for column 214.1, and slicegate valves 215.2 and 216.1 for column 214.2, thereby maintaining a sealed condition and eliminating fluid spillage. Balls 300 are selectively directed into column 214.1 or 214.2 via flapper 214.3.

Sequential operation of column 214.1 or 214.2 takes place when the selected column 214.1 or 214.2 has attained its capacity of balls 300, at which time valves 215.1, 215.2, 216.1 and 216.2 are switched, wherein entry of balls 300 is subsequently permitted to the other of columns 214.1 or 214.2. As such, only one column 214.1 or 214.2 is open to joining section 214.5 and only one column 214.2 or 214.1 is open to dividing section 214.4.

In view of the importance of operation of valves 215.1, 215.2, 216.1 and 216.2 to selectively permit entry of balls 300 to either column 214.1 or 214.2, the sequence of operation is set forth in FIGS. 6a–6c.

Referring now more specifically to FIG. 6a, wherein buoyancy column 214.1 is shown in "emptying mode" and buoyancy column 214.2 is shown in "collecting mode", slicegate valve 215.1 is in open position A, thereby permitting balls 300 to rise into joining section 214.5 while slicegate valve 216.2 is in closed position B, and thus providing a vacuum head thereunder. Slicegate valve 215.2 seals second column 214.2; thereby preventing balls 300 from rising into joining section 214.5, and providing a vacuum head under slicegate valve 215.2. Slicegate valve 216.1 allows balls 300 to enter second column 214.2 as directed by flapper 214.3.

Referring now to FIG. 6b, wherein both buoyancy column 214.1 and buoyancy column 214.2 are depicted in "sealed mode" in transition between allowing passage of balls 300 out of column 214.1 to permitting passage of balls 300 out of column 214.2, slicegate valves 215.1, 215.2, 216.1 and 216.2 are all in closed position B, thereby completely sealing columns 214.1 and 214.2, preventing movement of balls 300, and maintaining a vacuum head below slicegate valves 216.2 and 216.1. Flapper 214.3 extends downward, impeding progress of balls 300 into dividing section 214.4.

Referring now to FIG. 6c, wherein buoyancy column 214.1 is shown in "collecting mode" and buoyancy column 214.2 is shown in "emptying mode", following transition from dispensing of balls 300 from column 214.1 to dispensing of balls 300 from column 214.2, slicegate valve 215.2 is in open position A and 216.1 is in closed position B, allowing balls 300 to exit from column 214.2 into joining section 214.5 while maintain a vacuum head below slicegate valve 216.1. Slicegate valve 215.1, now being in closed position B, seals first column 214.1 preventing balls 300 from rising into joining section 214.5 and further providing a vacuum head under slicegate valve 215.1. Slicegate valve 216.2 allows balls 300 to enter first column 214.1 as directed by flapper 214.3.

At all times, including while in a transitioning mode, columns 214.1 and 214.2 must seal buoyancy shaft 200 to maintain level 207 of fluid 206 in box 205, thereby negating the pressure developed by the fluid head in one fluid column 214.1 or 214.2, while the other fluid column 214.2 or 214.1, respectively, provides un-obstructed transit of balls 300 to top 200.1.

Referring now to FIG. 7, illustrated therein are the operational details of slicegate valves 215.1, 215.2, 216.1 and 216.2 by reference to slicegate valve 215.1 as an exemplar. Slicegate valve 215.1 comprises spring return air actuator 215.1.1, valve plate 215.1.2, rubber seal 215.1.3 and drive member 215.1.5, wherein drive member 215.1.5 is in communication with valve plate 215.1.2 and spring return air actuator 215.1.1. Spring return air actuator 215.1.1 is activated via air valve 213.4 and, in response, spring return air actuator 215.1.1 moves valve plate 215.1.2 from closed position B to open position A, thereby permitting passage of balls 300 from column 214.1 into joining section 214.5. Upon release of air pressure to air valve 213.4, spring return air actuator 215.1.1 returns valve plate 215.1.2 to closed position B, thereby preventing exiting of balls 300 from column 214.1.

By providing closing of valves 215.1, 215.2, 216.1 and 216.2, failure of activation air will result in closure of both columns 214.1 and 214.2, thereby preventing spillage of fluid 206.

Referring now to FIG. 8, illustrated therein are details of fluid volume regulator 202 and timing mechanism 212. Fluid volume regulator 202 maintains level 219 of fluid 206 within buoyancy shaft 200. Timing mechanism 212 releases and delivers balls 300 onto wheel spokes 101 at a selected rate.

Fluid volume regulator 202 comprises fluid feeder 202.1, fluid level control tank 202.2, and fluid return pump 202.3. Fluid return pump 202.3 activates to return fluid 206 collected in overflow shaft 212.3 to buoyancy shaft 200. Fluid volume regulator 202 could also include a fluid heater and fluid temperature sensor to avoid freezing fluid 206 during exposure to low temperature if sealed shaft gravity-buoyancy generator 10 is utilized during freezing conditions. It will be recognized by those skilled in the art that fluid 206 should comprise a material that does not freeze under operating conditions, and/or should contain an antifreeze material.

Timing mechanism 212 regulates feeding of balls 300 from top 200.1 of buoyancy shaft 200. Timing mechanism 212 comprises ball feeder 212.2, overflow shaft 212.3, and spoke proximity sensor 212.4. During operation, balls 300 are carried by fluid 206 and exit top 200.1 of buoyancy shaft 200 via floatation, traveling to release mechanism 212.5. Ball feeder 212.2 and release mechanism 212.5 are paced and controlled by spoke proximity sensor 212.4, wherein spoke proximity sensor senses wheel spoke 101 position, releasing and delivering balls 300 onto spokes 101. Ball feeder 212.2 controls the speed of sealed shaft gravity-buoyancy generator 10, as best shown in FIG. 4.

Governor/brake 109 is controlled by ball feeder 212.2 to regulate the speed of sealed shaft gravity-buoyancy generator 10. The natural rotational speed of the apparatus is a function of the density of balls 300, radius of the wheel 100, and size of buoyancy shaft 200 and collector box 205. Governor/brake 109 further compensates for variability of braking resulting from loading of electrical generator 400, wherein electrical generator 400 acts as a brake balancing the speed of wheel 100. As wheel 100 gains more weights during start-up mode, if wheel 100 is not properly controlled by generator 400 under load, the speed of wheel 100 can increase out of control; therefore, speed of rotation of wheel 100 must be determined and governed accordingly. In operation, it is necessary that wheel 100 rotate at a speed matching the rate at which balls 300 are rising in buoyancy shaft 200.

Referring now to FIG. 9, tank 217 comprises associated diaphragm 217.1 and tank 218 comprises associated diaphragm 218.1. The displacement of fluid volume in the buoyancy columns 214.1 and 214.2 is adjusted for the increase in level 207 as balls 300 enter collector box 205, and for the reduction of level 219 as balls 300 are extracted from top 200.1 by device 202. Adjusting of levels 207 and 219 is accomplished by transferring air from one of drive chambers 217.21 or 218.21 into the other drive chamber 218.21 or 217.21, respectively, which subsequently adjusts the fluid volume in its respective buoyancy column 214.2 or 214.1.

Referring now to FIGS. 1 and 9, wherein first tank 217 comprises first diaphragm 217.1 and second tank 218 comprises second diaphragm 218.1, tanks 217 and 218 are comprised of a transparent material to visually inspect and ensure that tanks 217 and 218 are filled with fluid 206 at all times. Alternately tanks 217 and 218 may be constructed of any suitable material, incorporating therein a sighting means, as is known within the art, and example of which would comprise a sight glass. Tanks 217 and 218 compensate for volume changes in fluid 206 volume that occur when balls 300 enter or exit fluid 206 in buoyancy shaft 200. As balls 300 enter collector box 205, level 207 of fluid 206 will rise, and similarly, as balls 300 exit from buoyancy shaft 200 at top 200.1 thereof, level 219 of fluid 206 will fall. This is due to the total volume increasing in collector box 205 when adding balls 300 and total volume decreasing at top 200.1 when taking balls 300 out of buoyancy shaft 200.

For sake of the following example, the condition selected is that wherein slicegate valve 215.1 is open, slicegate valve 215.2 is closed, slicegate valve 216.1 is open and slicegate valve 216.2 is closed. Sealed-shaft gravity-buoyancy generator 10 is able to increase level 219 and reduce level 207 by transferring air to first drive chamber 217.21 from second drive chamber 218.21 using air compressor pump 213.1. Activation of air compressor pump 213.1 and selection of the appropriate drive chamber 217.21 and 218.21 takes place via valves 213.4 and 213.5 wherein valves 213.4 and 213.5, respectively, are activated based on information obtained via fluid levels sensors 213.9 and 213.3 for levels 207 and 219, respectively.

Start-up plugs 217.4 and 218.4, priming pump 217.7, valve 217.8, and gauges 217.5, 217.6, 218.5 and 218.6, are utilized at the time of the starting up sealed shaft gravity buoyancy generator 10 to ensure that all air is exhausted prior to start-up; thus, it is of great importance that both tanks 217 and 218 are completely filled with fluid 206 prior to start-up. It will be recognized by those skilled in the art that gauges 217.5, 217.6, 218.5 and 218.6 could comprise transducers, wherein a signal could be provided to controller 220 to further automate gravity-buoyancy generator 10.

Fluid levels 207 and 219 are maintained by displacing fluid at the respective tank 217 or 218, air is transferred from one drive chamber 217.21 or 218.21 to the other drive chamber 218.21 or 217.21. By decreasing the air volume in drive chamber 217.21 or 218.21 on the closed fluid shaft side, the level 207 of fluid 206 is lowered and vice versa. By increasing the air volume in drive chamber 218.21 or 217.21 on the open fluid shaft side, the level 219 of fluid 206 is increased and vice versa.

The volume size of tanks 217 and 218 as well as diaphragms 217.1 and 218.1 is selected to be equal or slightly smaller than the volume contained in column 214.1 and 214.2, respectively; this is necessary to be able to maintain fluid levels 207 and 219 satisfactorily.

It is understood that the system may also be comprised of a number of variations of the same configurations and sealed-shaft gravity buoyancy generator 10 could have a number of parallel buoyancy shafts 200 and wheels 100 acting on a common shaft 103 turning a single or several generators 400, wherein such a plurality of buoyancy shafts 200 could have several collector boxes 205 or a common collector box 205 with single common or several buoyancy shafts 200. The desired amount of energy generated is a function of the number of wheels 100 the size of the radius thereof, and the density and number of balls 300 in wheel 100.

Figure 10:
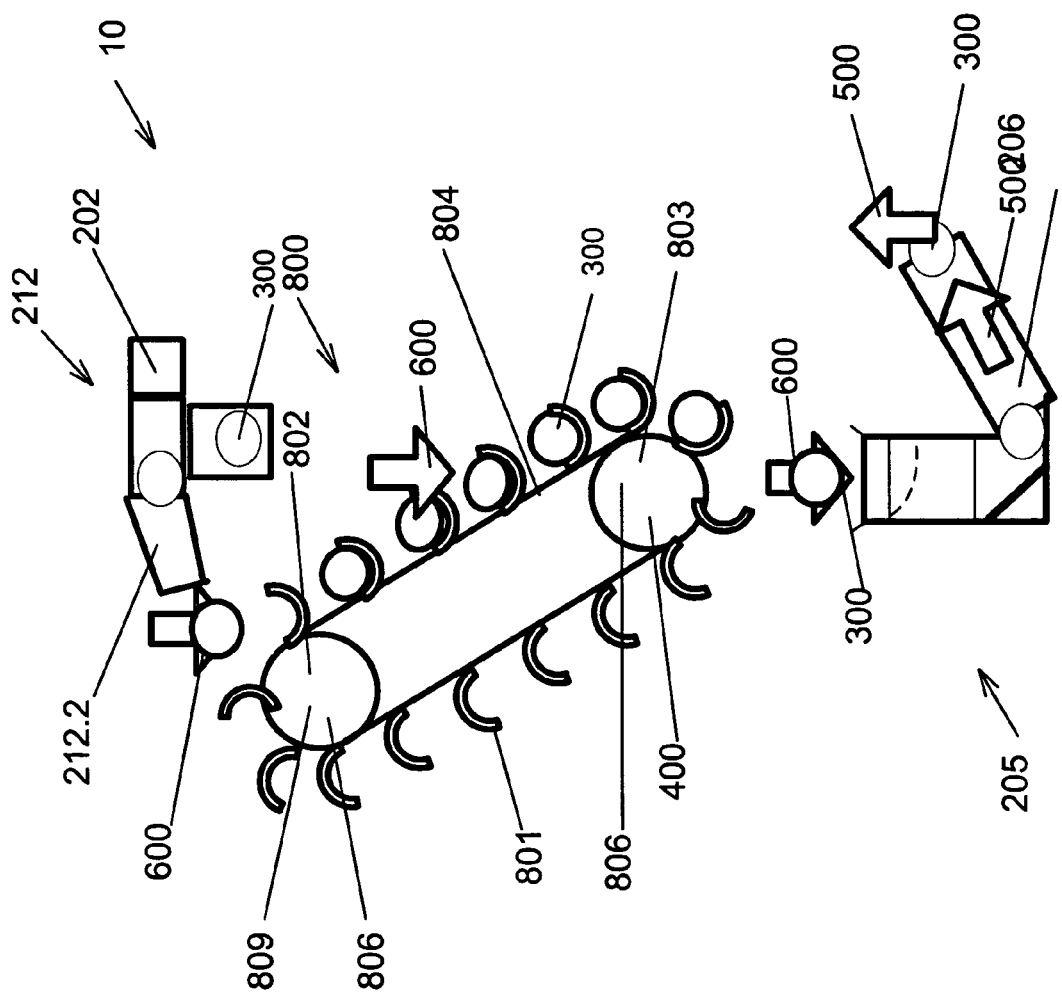
FIG. 10 is a side plan view of a sealed-shaft gravity-buoyancy energy system according to an alternate embodiment of the present invention.

Referring now more specifically to FIG. 10, illustrated therein is an alternate embodiment of device 10, wherein the alternate embodiment of FIG. 10 is substantially equivalent in form and function to that of the preferred embodiment detailed and illustrated in FIGS. 1–9 except as hereinafter specifically referenced. Specifically, the embodiment of FIG. 10 comprises carrier 800, wherein carrier 800 comprises upper drum 802, lower drum 803 and belt 804. Upper drum 802 comprises governor/brake 809 and lower drum 803 comprises generator 400. Belt 804 has a plurality of cup arms 801 disposed thereon, wherein cup arms 801 are adapted to receive balls 300 from timing mechanism 212 and deposit balls 300 into collector box 205. Balls 300 are dispensed via timing mechanism 212 proximate to upper drum 802, wherein balls 300 fall into cup arms 801 and are carried downward by gravitational force 600, releasing from cup arms 801 and falling into collector box 205.

Referring now more specifically to FIG. 11, illustrated therein is an alternate embodiment of gravity-buoyancy generator 10, wherein the alternate embodiment of FIG. 11 is substantially equivalent in form and function to that of the preferred embodiment detailed and illustrated in FIGS. 1–9 except as hereinafter specifically referenced. Specifically, the embodiment of FIG. 11 comprises buoyancy columns 214.1 and 214.2, wherein buoyancy columns 214.1 and 214.2 are in fluid communication with first tank 217 and second tank 218, respectively. First tank 217 comprises first air balloon 217.11, first fluid chamber 217.20 and first drive chamber 217.21, wherein first air balloon 217.11 is in fluid communication with control air line 217.2, and wherein first air balloon 217.11 can be selectively inflated or deflated via air control line 217.2. Similarly, second tank 218 comprises second air balloon 218.11, second fluid chamber 218.20 and second drive chamber 218.21, wherein second air balloon 218.11 is in fluid communication with control air line 218.2, and wherein second air balloon 218.11 can be selectively inflated or deflated via air control line 218.2

Referring now more specifically to FIG. 12, illustrated therein is an alternate embodiment of gravity-buoyancy generator 10, wherein the alternate embodiment of FIG. 12 is substantially equivalent in form and function to that of the preferred embodiment detailed and illustrated in FIGS. 1–9 except as hereinafter specifically referenced. Specifically, the embodiment of FIG. 12 comprises buoyancy columns 214.1 and 214.2, wherein buoyancy columns 214.1 and 214.2 are in fluid communication with first tank 217 and second tank 218, respectively. First tank 217 comprises first air piston 217.12, first spring 217.10, first fluid chamber 217.20 and first drive chamber 217.21, wherein first air piston 217.12 is in fluid communication with control air line 217.2. First air piston 217.12 can be selectively moved by providing or withdrawing air via air control line 217.2 with or against force of first spring 217.10, wherein fluid 206 is expelled from, or drawn into, respectively, first tank 217. First spring 217.10 serves to move first air piston 217.12 upon withdrawal of air from air control line 217.2. Similarly, second tank 218 comprises second air piston 218.12, second spring 218.10, second fluid chamber 218.20 and second drive chamber 218.21, wherein second air piston 218.12 is in fluid communication with control air line 218.2. Second air piston 218.12 can be selectively moved by providing or withdrawing air via air control line 218.2, with or against force of second spring 218.10, wherein fluid 206 is expelled from, or drawn into, respectively, second tank 218. Second spring 218.10 serves to move second air piston 218.12 upon withdrawal of air from control air line 218.2.

It is envisioned in another alternate embodiment of the present invention that balls 300 could be magnetic and could fall through an electrical field generated by a coil thereby generating electrical energy directly and obviating a need for generator 400.

It is envisioned in yet another alternate embodiment of the present invention that generator 400 could be replaced by an air compressor to store energy in a tank as compressed air.

It is further envisioned in an alternate embodiment that in lieu of fluid activated valves that may include air valves, electrical valves could be utilized.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A sealed shaft gravity-buoyancy energy system comprising:
   a means for rotation;
   an output means for providing mechanical power;
   an hermetically-sealable buoyancy chamber;
   a plurality of objects of selected density; and
   a fluid of selected density, wherein said plurality of objects comprises spherical masses, and wherein said hermetically-sealable buoyancy chamber comprises an entry and an exit, and wherein said hermetically-sealable buoyancy chamber comprises fluid level sensors at said entry and said exit.

2. The energy system of claim 1, wherein said means for rotation comprises a wheel comprising a plurality of spoke arms, and wherein at least one of said plurality of objects is removably disposed within one of said plurality of spoke arms.

3. The energy system of claim 1, further comprising a collector box adapted to receive said spherical masses.

4. The energy system of claim 1, wherein said means for rotation rotates under gravitational force exerted upon said at least one of said spherical masses.

5. The energy system of claim 2, wherein at least one of said plurality of arms moves in a downwardly direction in response to gravitational force exerted thereupon.

6. The energy system of claim 1, wherein said means for rotation comprises a belt comprising cup arms, wherein said belt rotates about an upper drum and a lower drum.

7. The energy system of claim 1, wherein said output means for providing mechanical power is adapted to drive an electrical generator.

8. A power generation system comprising:
   a buoyancy shaft having two independently-selectable columns;
   a power generator;
   a means for rotating said power generator; and
   a means for raising said buoyant masses, wherein said two independently-selectable columns comprise fluid tanks, and wherein said fluid tanks comprise means for varying, and wherein said means for varying selectively vary the quantity of fluid within said fluid tanks, and wherein said means for varying comprises diaphragms.

9. The power generation system of claim 8, wherein said means for varying comprises air balloons.

10. The power generation system of claim 8, wherein said means for varying comprises pistons having springs associated therewith.

11. A method of generating power, said method comprising the step of:
   a. obtaining a sealed-shaft gravity-buoyancy energy system comprising an hermetically-sealable buoyancy shaft;
   b. placing a ball on a spoke arm of a wheel at the beginning of a cycle to start said cycle, wherein a spoke proximity sensor directs a ball feeder to coordinate placement of said ball onto said spoke arm;
   c. rotating said wheel via gravitational force acting up on said ball, wherein said wheel is in communication with and rotates an electrical generator to generate electrical energy;
   d. depositing said ball to a collector box;
   e. opening a dry gate in said collector box via weight of said ball;
   f. submerging said bail in a fluid;
   g. directing said ball into said buoyancy shaft via an inclined doorstop;
   h. raising a plurality of balls to a top portion of said buoyancy shaft via a buoyant force;
   i. counting a maximum capacity of said plurality of balls for said buoyancy shaft; and
   j. selecting a first column or a second column for insertion of additional said plurality of balls, while opening said second column or said first column, respectively, to permit said plurality balls contained therein to ascend to said top portion of said buoyancy shaft.

12. The method of generating power of claim 11, wherein said sealed-shaft gravity-buoyancy energy system comprises a means for rotation and an output means for providing mechanical power.

13. The method of generating power of claim 11, wherein said hermetically-sealable buoyancy shaft comprises a first column and a second column, a plurality of objects of selected density, and a fluid of selected density.

14. The method of generating power of claim 11, further comprising the step of:
   k. repeating said steps a through j.

15. The method of generating power of claim 14, further comprising the steps of:
   l. sensing an increased level of said fluid, due to entrance of said ball into said buoyancy shaft, via a level sensor, wherein said level sensor further activates a pump to deflate a first diaphragm, thereby lowering a first fluid level in said first column of said buoyancy shaft; and
   m. inflating a second diaphragm to raise a second fluid level in said second column of said buoyancy shaft, wherein said step in is implemented simultaneously with said step of sensing an increased level of said fluid.

16. The method of generating power of claim 14, said method further comprising the steps of:
   l. sensing a decreased level of said fluid, due to exiting of said ball from said buoyancy shaft, via a level sensor, wherein said level sensor further activates a pump to inflate a first diaphragm, thereby raising a first fluid level in said first column of said buoyancy shaft; and
   m. deflating a second diaphragm to lower a second fluid level in said second column of said buoyancy shaft, wherein said step m is implemented simultaneously with said step of sensing an increased level of said fluid.

17. A sealed shaft gravity-buoyancy energy system comprising:
   a means for rotation;
   an output means for providing mechanical power;
   an hermetically-sealable buoyancy chamber;
   a plurality of objects of selected density; and
   a fluid of selected density, wherein said hermetically-sealable buoyancy chamber comprises at least two columns, and wherein said at least two columns comprise associated tanks, and wherein said associated tanks comprise diaphragms therewithin, and wherein said diaphragms are adapted to adjust the level of a fluid within said at least two columns.

18. The energy system of claim 17, wherein said at least two columns are independently sealable.

* * * * *